United States Patent Office 3,527,824
Patented Sept. 8, 1970

3,527,824
TRANSALKYLATION PROCESS
Ernest L. Pollitzer, Skokie, Ill., assignor to Universal Oil Products Company, Des Plaines, Ill., a corporation of Delaware
No Drawing. Continuation-in-part of application Ser. No. 694,061, Dec. 28, 1967. This application July 1, 1968, Ser. No. 741,307
Int. Cl. C07c 3/50, 3/58
U.S. Cl. 260—672                                    5 Claims

ABSTRACT OF THE DISCLOSURE

Toluene is transalkylated utilizing a catalyst comprising a crystalline aluminosilicate, a Group VIII metal and an additional component selected from the group consisting of arsenic, antimony, bismuth, selenium, tellurium, and compounds thereof.

CROSS-REFERENCES TO RELATED APPLICATIONS

This application is a continuation-in-part of my copending application Ser. No. 694,061, filed Dec. 28, 1967, now Pat. No. 3,417,157.

DESCRIPTION OF THE INVENTION

This invention relates to a conversion process for the transalkylation of toluene into more useful compounds. More specifically, this invention is concerned with a conversion process for the transalkylation of toluene utilizing a catalyst comprising a crystalline aluminosilicate, a Group VIII metal and an additional component selected from the group consisting of arsenic, antimony, bismuth, selenium, tellurium and compounds thereof.

A specific object of this invention is to provide a novel method for transalkylating toluene to provide the desired benzene and xylenes in high yields.

One embodiment of this invention relates to a transalkylation process which comprises contacting toluene at transalkylation conditions including a temperature in the range of from 400° C. to about 520° C., a pressure in the range of from about atmospheric to about 100 atmospheres, a hydrogen to hydrocarbon mole ratio of from about 2:1 to about 20:1 and a feed additive in an amount of from about 0.001 weight percent to about 2.0 weight percent of said toluene selected from the group consisting of sulfur, and water with a catalyst comprising a crystalline aluminosilicate, a Group VIII metal and an additional component selected from the group consisting of arsenic, antimony, bismuth, selenium, tellurium and compounds thereof.

Other objects and embodiments will be found in the following further detailed description of my invention.

The catalyst employed in my invention consists essentially of a support comprising a crystalline aluminosilicate, a Group VIII metal, and an additional component selected from the group consisting of arsenic, antimony, bismuth, selenium, tellurium and compounds thereof. The crystalline aluminosilicates are composed of $SiO_4$ and $AlO_4$ tetrahedra, a silicon or aluminum atom being centered around 4 oxygen atoms in the tetrahedra and the oxygens being shared with other surrounding tetrahedra. These aluminosilicates are geommetrically arranged to form a pore structure having sufficiently large pore mouths to permit the reactant molecule to pass into said pore structure. Preferably, the aluminosilicates employed in the catalyst support have pore mouths of from about 5 up to about 15 angstroms in cross-sectional diameter. The aluminosilicates are treated to improve their catalytic activity by techniques such as ion-exchange with suitable cations and thermal treatment and by treatment with acids such as hydrofluoric acid. Ordinarily, the aluminosilicates are synthetically prepared in the alkali metal form (usually sodium) and there is one monovalent alkali metal cation associated with these aluminum centered tetrahedra (to maintain electrical neutrality). The aluminosilicates may be ion-exchanged with polyvalent cations such as calcium, magnesium, beryllium, and the rare earths, etc. to replace a substantial amount of the monovalent cation. This causes one polyvalent cation to be associated with more than one aluminum centered tetrahedra and if these tetrahedra are spread sufficiently far apart (due to the presence of silicon centered tetrahedra) areas of local electrical charge will be formed which aid in promoting catalytic reactions. Another treating technique to improve the catalytic activity of the aluminosilicates is to ion-exchange with ammonium ions followed by thermal treatment, preferably above 300° C. to convert the crystalline aluminosilicates to the hydrogen form.

There are numerous types of crystalline aluminosilicates, both synthetic and natural occurring, it is preferable that the pore mouths of the crystalline aluminosilicates have a cross-sectional diameter of from about 5 to about 15 angstrom units. Among the preferable crystalline aluminosliciates that are suitable are the hydrogen and/or polyvalent forms of faujasite and mordenite.

The concentration of crystalline aluminosilicate may be as high as 100% or the crystalline aluminosilicate may contain a matrix which may be selected from the group consisting of silica, alumina and silica-alumina mixtures. The concentration of crystalline aluminosilicate, for example, in an alumina matrix is preferably less than about 40 weight percent of the alumina although in some cases greater concentations may also be suitable. Concentrations of aluminosilicates of about 20 weight percent or less are especially preferred. The concentrations of Group VIII metal depends to a large extent on the metal. The Group VIII metals include platinum, palladium, iridium, ruthenium, rhodium, osmium, and these metals may be present as the element, as a chemical compound or in association with the other catalyst components. I prefer utilizing platinum and/or palladium for use in my invention and the Group VIII metals will be present in an amount of from about 0.05 to about 5.0 weight percent.

An additional component of this catalyst is a component selected from the group consisting of arsenic, antimony, bismuth, selenium, tellurium and compounds thereof. I prefer utilizing at least one of these components, preferably arsenic in an atomic ratio to Group VIII metal of from about 0.1 to about 1.0, and preferably from about 0.3 to about 0.7. I have found that when using such an additional component in my process, a more selective toluene transalkylation reaction occurs in that the desired xylene isomers are formed in greater yields and the production of non-aromatics decreases significantly.

The process of this invention utilizing the catalyst hereinbefore set forth may be effected in any suitable manner and may comprise either a batch or a continuous type of operation. The preferred method by which the process of this invention may be effected is a continuous type operation. One particular method is the fixed bed operation in which the toluene is continuously charged to a reaction zone containing a fixed bed of the desired catalyst, said zone being maintained at the proper operating conditions of temperature and pressure, that is, a temperature in the range of from about 400° C. to about 520° C. or more, and preferably from about 425° C. to about 515° C., a pressure of from about atmospheric to about 100 atmospheres or more, and a hydrogen to hydrocarbon mole ratio of from about 2:1 to about 20:1. The catalyst is suitable for either gas phase or liquid phase reactions so that the liquid hourly space velocity (the volume of charge per volume of catalyst per hour) may be maintained in the reaction zone in the range from about 0.1 to about 20 or more, preferably in the range of from about 0.1 to about 10, or at a gaseous hourly space velocity in the range of from about 100 to 1500 or more. The reaction zone may comprise an unpacked vessel or coil or may be lined with an adsorbent packing material. The charge passes through the catalyst bed in either an upward or downward or radial flow and the transalkylation product is continuously withdrawn, separated from the reactor effluent and recovered, while any unreacted starting material may be recycled to form a portion of the feed stock.

Feed additives in an amount of from about 0.001 weight percent to about 2.0 weight percent of the toluene feed are added to the transalkylation zone by, for example, commingling said feed additive with the hydrocarbon charge stock passing thereto or, by adding the feed additive simultaneously with, but independently of said hydrocarbon charge. However, the particular catalyst utilized as well as the particular transalkylation conditions will dictate the feed additive desired and the amount that is necessary for efficient operation of my transalkylation process. Feed additives that are utilizable in my process are those providing chloride and/or sulfur, and/or water. Especially preferred feed additives for use in my invention are those selected from the group consisting of sulfur, sulfur compounds, water and oxygen-containing compounds. For example, those additives that may provide sulfur include sulfur, hydrogen sulfide, the primary, secondary and tertiary alkane and cycloalkane thiols, and the alkane sulfides and disulfides. Those additives that may provide water include water, and those oxygen-containing compounds such as the various alcohols which liberate water by decomposition at the conditions prevailing in the reaction zone.

Another continuous type operation comprises the moving bed type in which the toluene, feed additive and the catalyst bed move either concurrently or countercurrently to each other while passing through said reaction zone. Another type operation which may be used is the batch type operation in which a quantity of the toluene, feed additive and the catalyst are placed in an appropriate apparatus, such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are given to illustrate the process of the present invention and are introduced for the purpose of illustration only with no intention of unduly limiting the generally broad scope of my invention.

EXAMPLE I

A catalyst comprising hydrogen form high silica faujasite, 0.375 weight percent platinum and 0.4 atom of arsenic per atom of platinum was placed in a transalkylation reaction zone. Toluene, along with 2000 p.p.m. water was continuously charged to said reaction zone at conditions including a temperature of 440° C., a pressure of 500 p.s.i.g., a hydrogen to hydrocarbon mole ratio of 10:1, and a LHSV of 2.0. The concentration of toluene remaining in the product was 53.4 weight percent. The $C_8$ aromatic make was 15.6 weight percent. The non-aromatics, benzene and $C_9+$ product, in weight percent was 13.4%, 15.6% and 2.0% respectively. The plant operating temperature was raised to 460° C., and the concentration of toluene remaining in the product decreased to 51.0 weight percent. The $C_8$ aromatic make was 17.2 weight percent. The non-aromatics, benzene and $C_9+$ product, in weight percent, was 7.9%, 20.4%, and 3.3%, respectively.

Operating conditions were then changed so that the LHSV was raised from 2.0 to 4.0. The concentration of toluene remaining in the product was 68.1 weight percent. The $C_8$ aromatic make was 13.4 weight percent. The non-aromatics, benzene and $C_9+$ product, in weight percent, was 4.5%, 12.2% and 1.8%, respectively.

Operating conditions were again changed in that the LHSV was raised from 4.0 to 6.0. The concentration of toluene remaining in the product was 75.5 weight percent. The $C_8$ aromatic make was 10.0 weight percent. The non-aromatics, benzene and $C_9+$ product, in weight percent, was 4.4%, 8.4%, and 1.7%, respectively. The plant operating temperature was then raised from 460° C. to 480° C. The concentration of toluene remaining in the product was 69.7 weight percent. The $C_8$ aromatic make was 12.7 weight percent. The non-aromatics, benzene and $C_9+$ product, in weight percent, was 4.2%, 10.9%, and 2.5%.

The plant operating pressure was then raised from 500 p.s.i.g. to 700 p.s.i.g. The concentration of toluene remaining in the product was 61.5 weight percent. The $C_8$ aromatic make was 14.0 weight percent. The non-aromatics, benzene and $C_9+$ product, in weight percent, was 6.1%, 15.6%, and 2.8%, respectively.

Operating conditions were then changed so that the plant LHSV was raised from 6.0 to 8.0. The toluene concentration in the product was 68.5 weight percent. The $C_8$ aromatic yield was 12.0 weight percent. The non-aromatics, benzene and $C_9+$ product, in weight percent, was 4.9%, 12.5% and 2.1%, respectively.

EXAMPLE II

A catalyst comprising hydrogen form high silica faujasite, 0.39 weight percent platinum and 0.5 atom of arsenic per gram of platinum was placed in a transalkylation reaction zone. Toluene, along with 600 p.p.m. sulfur and 2000 p.p.m. water was continuously charged to said reaction zone at conditions including a temperature of 480° C., a pressure of 500 p.s.i.g., a hydrogen to hydrocarbon mole ratio of 10:1, and a LHSV of 8.0.

The toluene remaining in the product was 70.4 weight percent. The $C_8$ aromatic make was 10.4 weight percent. The non-aromatics, benzene and $C_9+$ product, in weight percent, was 7.9%, 9.0%, and 1.3%, respectively.

The plant was operated at these operating conditions for a period of 15 hours. It was found that the toluene remaining in the product increased to about 75.8 weight percent. The $C_8$ aromatic make decreased slightly to 9.0 weight percent. The non-aromatics, benzene and $C_9+$ product, in weight percent, was 6.7%, 7.5% and 0.8%.

A second run was made with the same catalyst at a temperature of 460° C., a pressure of 500 p.s.i.g., a hydrogen to hydrocarbon mole ratio of 10:1 and a LHSV of 6.0. Toluene along with 600 p.p.m. sulfur was continuously charged to the reaction zone. The toluene remaining in the product, after 140 hours on stream was 73.9 weight percent. The $C_8$ aromatic make was 9.3 weight percent. The non-aromatics, benzene and $C_9+$ product, in weight percent, was 8.9%, 6.9%, and 1.0%, respectively. At the end of the 172 hour point in the run, the toluene remaining in the product was 73.2 weight percent. The $C_8$ aromatic make was 9.2 weight percent. The non-aromatics, benzene and $C_9+$ product, in weight percent, was 9.7%, 7.0%, and 0.9%, respectively.

EXAMPLE III

A catalyst comprising hydrogen form high silica faujasite, 0.11 weight percent platinum and 0.7 atom of arsenic per atom of platinum was placed in a transalkylation reaction zone. Toluene, along with 600 p.p.m. sulfur was continuously charged to said reaction zone at a temperature of 480° C., a pressure of 500 p.s.i.g., a hydrogen to hydrocarbon mole ratio of 10:1 and a LHSV of 2.0.

The toluene remaining in the product was 72.3 weight percent. The $C_8$ aromatic make was 11.1 weight percent.

The non-aromatics, benzene and $C_9+$ product, in weight percent, was 6.8%, 7.9%, and 1.9%, respectively.

Operating conditions were changed so that the LHSV was lowered from 2.0 to 1.0. At these conditions, the toluene remaining in the product decreased to 66.0 weight percent. The $C_8$ aromatic make increased to 13.5 weight percent. The non-aromatics, benzene and $C_9+$ product, in weight percent, was 7.4%, 10.7%, and 2.4% respectively.

EXAMPLE IV

A catalyst comprising 5% hydrogen form mordenite, 0.375 weight percent platinum and 0.5 atom of arsenic per atom of platinum is placed in the transalkylation reaction zone. Toluene along with 500 p.p.m. sulfur is continuously charged to said reaction zone at conditions including a temperature of 470° C., a pressure of 500 p.s.i.g. and a hydrogen to hydrocarbon mole ratio of 10:1. The concentration of toluene remaining in the product is 62 weight percent. The $C_8$ aromatic make is 17 weight percent. The non-aromatics, benzene and $C_9+$ product, in weight percent, are 5.8%, 13.5%, and 1.5%, respectively.

EXAMPLE V

A catalyst comprising hydrogen form high silica faujasite, 0.30 weight percent palladium and 0.5 atom of arsenic per atom of palladium is placed in the transalkylation reaction zone. Toluene is continuously charged to said reaction zone along with the 600 p.p.m. sulfur at conditions including a temperature of 460° C., a pressure of 500 p.s.i.g., a hydrogen to hydrocarbon mole ratio of 10:1 and a LHSV of 1.0. The concentration of toluene remaining in the product is 74.6 weight percent. The $C_8$ aromatic make is 9.8 weight percent. The non-aromatics, benzene and $C_9+$ product, in weight percent, is 5.0%, 8.8% and 1.8%, respectively.

I claim as my invention:

1. A transalkylation process which comprises contacting toluene at transalkylation conditions including a temperature in the range of from about 400° C. to about 520° C., a pressure in the range of from about atmospheric to about 100 atmospheres, a hydrogen to hydrocarbon mole ratio of from about 2:1 to about 20:1 and a feed additive in an amount of from about 0.001 weight percent to about 2.0 weight percent of said toluene selected from the group consisting of sulfur, sulfur compounds, water and oxygen-containing compounds with a catalyst comprising a crystalline aluminosilicate a Group VIII metal and an additional component selected from the group consisting of arsenic, antimony, bismuth, selenium, tellurium and compounds thereof in an atomic ratio to Group VIII metal of from about 0.1 to about 1.0.

2. The process of claim 1 further characterized in that said crystalline aluminosilicate contains a refractory inorganic oxide matrix and at least one active catalyst ingredient is carried by said matrix.

3. The process of claim 2 further characterized in that said crystalline aluminosilicate is in the hydrogen form, that said refractory inorganic oxide matrix is an alumina matrix, that said Group VIII metal is selected from the group consisting of platinum and palladium, and that said additional component is arsenic.

4. The process of claim 2 further characterized in that the crystalline aluminosilicate is a mordenite type, that said Group VIII metal is selected from the group consisting of platinum and palladium, and that said additional component is arsenic.

5. The process of claim 2 further characterized in that the crystalline aluminosilicate is a faujasite type, that said Group VIII metal is selected from the group consisting of platinum and palladium, and that said additional component is arsenic.

References Cited

UNITED STATES PATENTS

| | | | |
|---|---|---|---|
| 3,140,253 | 7/1964 | Plank et al. | 208—120 |
| 3,281,483 | 10/1966 | Benesi et al. | 260—672 |
| 3,293,319 | 12/1966 | Haensel et al. | 260—683.3 |
| 3,310,599 | 3/1967 | Haensel et al. | 260—683.3 |

FOREIGN PATENTS

| | | |
|---|---|---|
| 1,081,373 | 8/1967 | Great Britain. |

DELBERT E. GANTZ, Primary Examiner

G. E. SCHMITKONS, Assistant Examiner

U.S. Cl. X.R.

252—455; 260—671, 674